(12) United States Patent
Valkama et al.

(10) Patent No.: US 10,351,930 B2
(45) Date of Patent: Jul. 16, 2019

(54) SILVER RECOVERY BY ION EXCHANGE

(71) Applicant: OUTOTEC (FINLAND) OY, Espoo (FI)

(72) Inventors: Kari Valkama, Pori (FI); Mika Haapalainen, Pori (FI); Mikko Tyster, Espoo (FI); Sami Virolainen, Lappeenranta (FI)

(73) Assignee: OUTOTEC (FINLAND) OY, Espoo (FI)

( * ) Notice: Subject to any disclaimer, the term of this patent is extended or adjusted under 35 U.S.C. 154(b) by 258 days.

(21) Appl. No.: 15/315,534

(22) PCT Filed: Jun. 4, 2015

(86) PCT No.: PCT/FI2015/050387
§ 371 (c)(1),
(2) Date: Dec. 1, 2016

(87) PCT Pub. No.: WO2015/185804
PCT Pub. Date: Dec. 10, 2015

(65) Prior Publication Data
US 2017/0175224 A1   Jun. 22, 2017

(30) Foreign Application Priority Data
Jun. 5, 2014   (FI) .................................... 20145515

(51) Int. Cl.
*C22B 3/00*   (2006.01)
*C22B 3/06*   (2006.01)
*C22B 3/42*   (2006.01)

(52) U.S. Cl.
CPC ................ *C22B 3/42* (2013.01); *C22B 3/00* (2013.01); *C22B 3/06* (2013.01); *C22B 11/04* (2013.01); *Y02P 10/234* (2015.11)

(58) Field of Classification Search
CPC .............. C22B 3/00; C22B 3/06; C22B 3/42
See application file for complete search history.

(56) References Cited

U.S. PATENT DOCUMENTS

| 4,758,413 A | 7/1988 | Harris et al. |
| 7,407,587 B1 * | 8/2008 | Moller ............... B01J 20/06 |
| | | 210/683 |

(Continued)

FOREIGN PATENT DOCUMENTS

| CN | 86108388 A | 7/1988 |
| CN | 1053266 A | 7/1991 |

(Continued)

OTHER PUBLICATIONS

RU 2092597 C1 machine translation of the description. (Year: 1997).*

(Continued)

*Primary Examiner* — Tima M McGuthry-Banks
(74) *Attorney, Agent, or Firm* — Buchanan, Ingersoll & Rooney PC

(57) ABSTRACT

The present invention according provides a method of recovering silver from silver containing halide solutions, comprising the steps of: (a) providing an ion exchange column comprising a weak anion exchange resin; (b) introducing the silver containing halide solution to the ion exchange column to absorb silver in the weak anion exchange resin; (c) washing the loaded ion exchange resin with a first washing solution to rinse off absorbed zinc and optionally at least part of copper; (d) washing the loaded ion exchange resin with a second washing solution to rinse off remaining copper; and (e) optionally washing the loaded ion exchange resin with a third washing solution to rinse off absorbed lead; and (f) eluting the loaded ion exchange resin with an eluent to remove silver from the resin and to obtain a silver containing solution.

19 Claims, 3 Drawing Sheets

(56) References Cited

U.S. PATENT DOCUMENTS 8,206,595 B2 * 6/2012 Hiai .................. C22B 3/10
 210/660
2010/0116093 A1 5/2010 Hai et al.

FOREIGN PATENT DOCUMENTS

| CN | 1818098 A | 8/2006 |
| CN | 101120106 A | 2/2008 |
| EP | 0252185 A1 | 1/1988 |
| GB | 2059437 A | 4/1981 |
| JP | 49-020875 B * | 5/1974 |
| RU | 2092597 C1 * | 10/1997 |

OTHER PUBLICATIONS

JP 74020875 B machine translation of the description (Year: 1974).*
Derwent Acc-N0 1974-46322V for the patent family including JP 74020875 B (Year: 1974).*
Dardel et al. Ullmann's Encyclopedia of Industrial Chemistry. Wiley-VCH Verlag GmbH & Co. KGaA, Weihheim. pp. 473-546. doi :10.1002/14356007.a14_393.pub2 (Year: 2012).*
Fleming et al.: "The extraction of gold from cyanide solutions by strong- and weak-base anion-exchange resins," Journal of the South African Institute of Mining and Metallurgy, May 1984, vol. 84, No. 5, pp. 125-137.
Grosse: "The development of resin sorbents selective for gold in ammoniacal thiosulfate leach liquors," Doctoral Thesis Submitted to University of Tasmania, School of Chemistry, Sep. 2006, pp. 1-400.
Office Action (Examinational report No. 1 for standard patent application) dated Nov. 1, 2017, by the Australian Patent Office in corresponding Australian Patent Application No. 2015270354 (6 pages).
English language version of First Office Action and Search Report dated Sep. 14, 2017, issued by the State Intellectual Property Office of China in corresponding Chinese Patent Application No. 201580033311.0. ( 10 pages).
International Search Report (PCT/ISA/210) dated Aug. 31, 2015, by the European Patent Office as the International Searching Authority for International Application No. PCT/FI2015/050387.
Written Opinion (PCT/ISA/237) dated Aug. 31, 2015, by the European Patent Office as the International Searching Authority for International Application No. PCT/FI2015/050387.
International Preliminary Report on Patentability (PCT/IPEA/409) dated Jun. 16, 2016 for International Application No. PCT/FI2015/050387.
J. Aveston et al., "Recovery of Gold, Silver and Nickel From Alkaline Cyanide Solutions by Means of Weak-Base Ion-Exhange Resins", Journal of Applied Chemistry, Society of Chemical Industry, Feb. 8, 1958, pp. 77-86, XP-001064718.

* cited by examiner

PSI WPGM

Purolite A830

Purolite A170

Purolite A172

SILVER RECOVERY BY ION EXCHANGE

FIELD OF THE INVENTION

The present invention relates to a method of recovering silver from halide solutions, and particularly to silver recovery by ion exchange.

BACKGROUND OF THE INVENTION

Many copper and gold containing ores and concentrates contain silver to such a degree that is it economically reasonable to recover it. However, an efficient recovery of silver is rather difficult from a chloride-bromide based leaching solution. Silver concentration of the leach solution is usually low compared to copper and calcium and/or sodium concentrations. Furthermore, concentration of many leached metals like iron, zinc and lead can also be higher that the silver concentration. There are some process options for silver recovery such as cementation, sulfide precipitation or solvent extraction. Some of these processes are not suitable for chloride-bromide based leaching solutions where especially copper is present in very high concentrations.

US 20100116093 A1 discloses a method of recovering silver from a hydrochloric acid solution containing alkali and/or alkali earth metal chloride, silver, copper and iron ions, comprising the steps of: (1) bringing the solution into contact with a strong-base anion-exchange resin (such as PA-312 made by Mitsubishi Chemical Corporation) to adsorb silver, copper, and iron in the anion-exchange resin; (2) washing the anion-exchange resin with water to remove the adsorbed copper and iron; and (3) then bringing the ion-exchange resin into contact with a hydrochloric acid solution to elute the adsorbed silver.

One of the disadvantages associated with the above arrangement is that most of the copper must be removed prior to contact with anion-exchange resin by solvent extraction to achieve a copper concentration of from about 20 g/L to about 30 g/L. Furthermore, according to the publication the upper limit of the concentration of silver in the acidic solution is desirably 30 mg/L due to absorption limit of strong-base anion exchange resin.

BRIEF DESCRIPTION OF THE INVENTION

An object of the present invention is thus to provide an enhanced method for the recovery of silver from halide containing solutions. The objects of the invention are achieved by a method which is characterized by what is stated in the independent claim. The preferred embodiments of the invention are disclosed in the dependent claims.

The invention is based on the realization that utilization of a weak anion exchange resin allows selective recovery of silver from pregnant leach solutions (PLS). An advantage of the method of the invention is that silver can be recovered directly from a PLS solution without any pretreatment. Further, utilization of a weak anion exchange resin allows recovery of silver also from acidic solution comprising silver in high concentration.

BRIEF DESCRIPTION OF THE DRAWINGS

In the following the invention will be described in greater detail by means of preferred embodiments with reference to the drawings, in which.

DETAILED DESCRIPTION OF THE INVENTION

Figure 1:
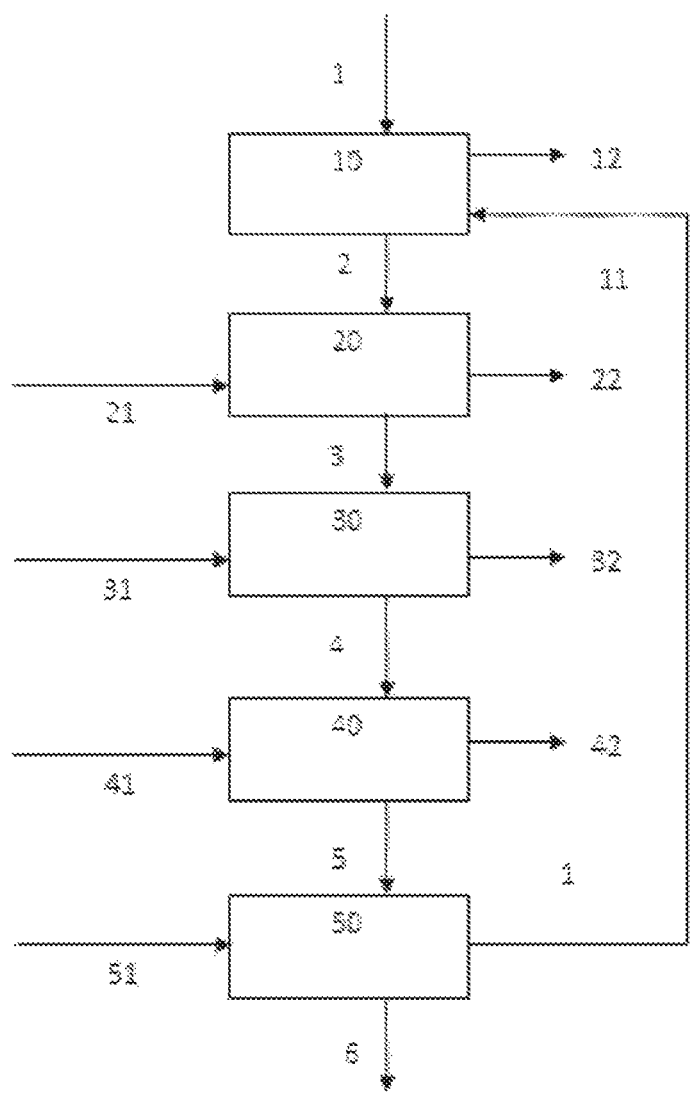
FIG. 1 illustrates a process flow of an example of the method of the present invention.
Figure 2:
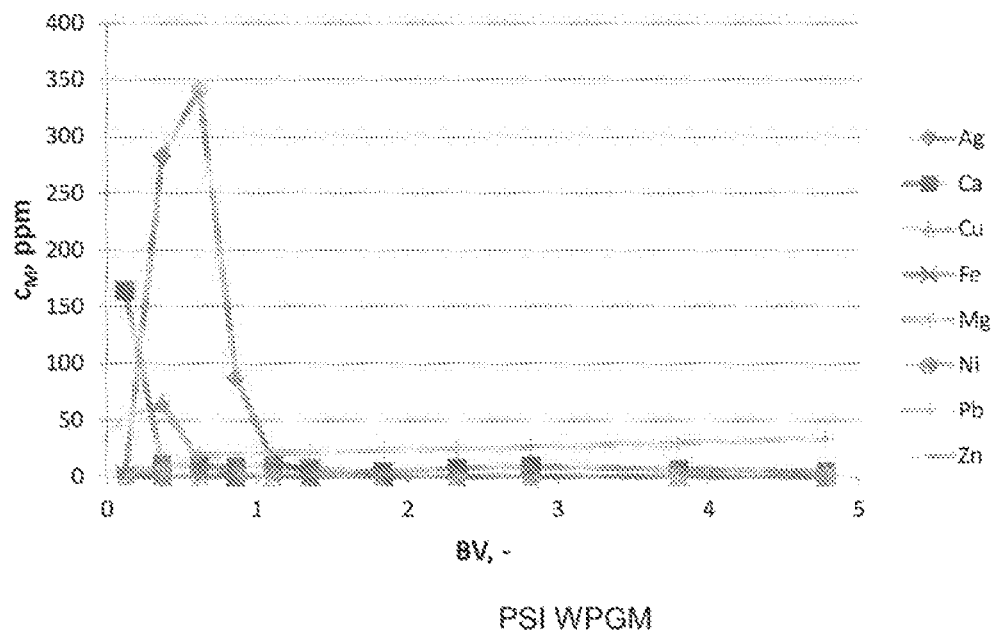
FIG. 2 shows composition of the eluate during elution of a PSI WPGM ion exchange column with a HCl solution comprising thiourea.
Figure 3:
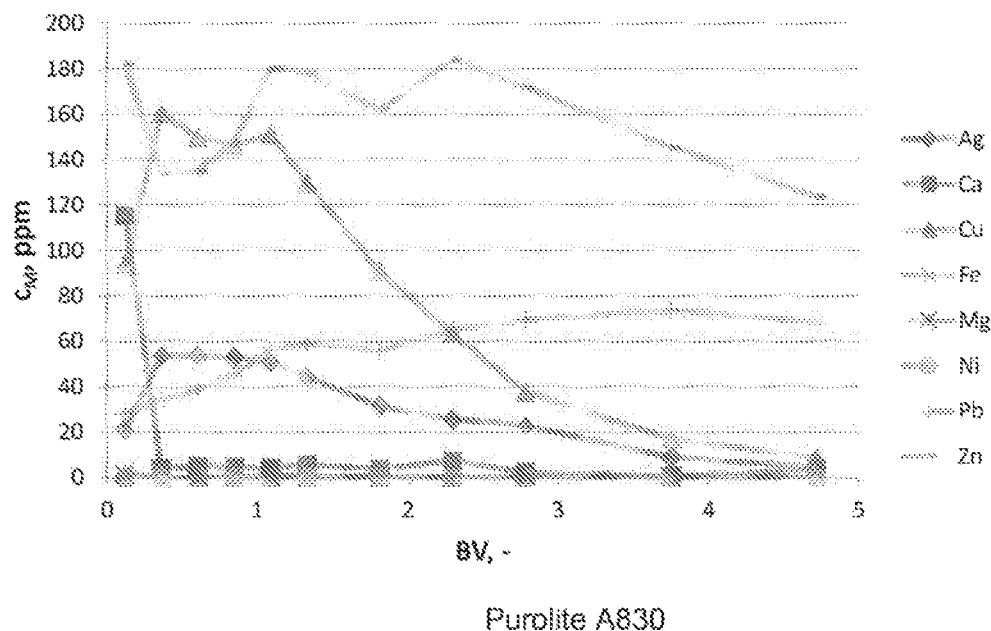
FIG. 3 shows composition of the eluate during elution of a Purolite A830 ion exchange column with a HCl solution comprising thiourea.
Figure 4:
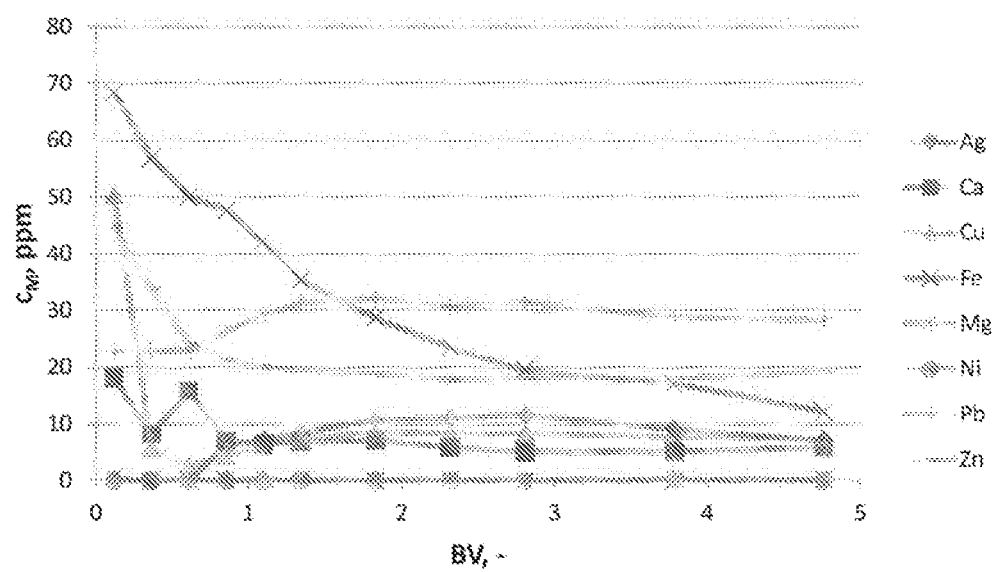
FIG. 4 shows composition of the eluate during elution of a PSI Purolite A170 ion exchange column with a HCl solution comprising thiourea.
Figure 5:
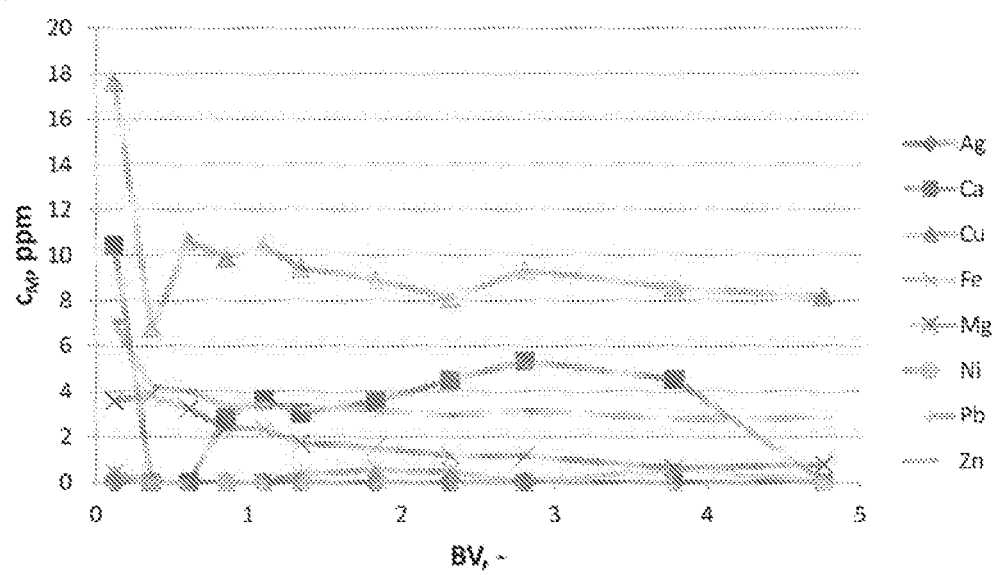
FIG. 5 shows composition of the eluate during elution of a PSI Purolite A172 ion exchange column with a HCl solution comprising thiourea.

Silver exists mainly as anionic halide complexes in solutions containing a high concentration of halides. Now it has been surprisingly found that silver can be recovered from pregnant leach solutions resulting from hydro-metallurgical treatment of silver containing ores and/or concentrates utilizing a weak anion exchange resin. By feeding the pregnant leach solution through an ion exchange column comprising sufficient resin bed, all or most of the silver can be removed from the pregnant leach solution. However, all lead and some zinc are also absorbed into the resin. Also, because of a high copper concentration, significant amount of copper is also absorbed into the resin. In accordance with this invention, all or most of the absorbed copper, zinc and lead can be removed by washing the column as will be discussed below before eluting silver from the resin. Accordingly, a purified and concentrated silver solution is obtained.

The present invention according provides a method of recovering silver from silver containing halide solutions, comprising the steps of:

(a) providing an ion exchange column comprising a weak anion exchange resin;

(b) introducing the silver containing halide solution to the ion exchange column to absorb silver in the weak anion exchange resin;

(c) washing the loaded ion exchange resin with a first washing solution to rinse off absorbed zinc and most of copper;

(d) washing the loaded ion exchange resin with a second washing solution to rinse off remaining copper;

(e) optionally washing the loaded ion exchange resin with a third washing solution to rinse off absorbed lead; and (f) eluting the loaded ion exchange resin with an eluent to remove silver from the resin and to obtain a silver containing solution.

The method of the present invention is particularly suitable for pregnant leach solutions resulting from hydrometallurgical treatment of silver containing ores and/or concentrates. In particular pregnant leach solution resulting from chloride based leaching of copper and gold ores and/or concentrates can be treated with the method of the invention.

The halides are typically present as chlorides. However, also bromides may be present and/or added to the solution. Such silver containing halide solutions may be obtained e.g. from leaching of silver containing ores and/or concentrates with leaching agents containing HCl and/or using Cl containing process water together in the process steps, in particular leaching step, preceding the recovery steps of the present invention. Such process water can for example be saline water obtained e.g. from sea or saline lakes. Chloride can also enter the process from the raw material.

In an example of the present invention the halide, in particular chloride, concentration of the silver containing halide solution is from 100 to 300 g/L, preferably from 150 to 280 g/L, more preferably from 200 to 250 g/L. In a further example of the present invention the bromide concentration of the silver containing halide solution is up to 90 g/L, preferably from 5 to 80 g/L, more preferably from 10 to 50 g/L, most preferably form 15 to 20 g/L.

In an example of the present invention the silver containing halide solution comprises from 0.1 to 1500 mg/L, preferably from 0.5 to 220 mg/L, more preferably from 30 to 100 mg/L, silver. In a particular example of the present invention the silver containing halide solution is obtained by leaching silver containing ore and/or concentrate with an acidic aqueous leaching liquor comprising from 10 to 110 g/L $Cu^{2+}$, from 50 to 300 g/L $Cl^-$, and from 1 to 80 g/L $Br^-$. Acid concentration of said leaching liquor is typically from 5 to 20 g/L HCl.

Recovery of silver from silver containing halide solutions as defined above can be accomplished by ion exchange columns comprising a weak anion exchange resin, preferably a weak base anion exchange resin. The weak anion exchange resins utilized in the present invention preferably comprise amine groups as the anion-exchange functional groups i.e. as the groups that serve as the anion exchanging sites of the resin composition. It is to be understood that adsorption is a physical phenomenon. In this case silver is chemically sorpted to the ion exchange resin and therefore the word "absorb" is used in this application. This wording is however not meant to restrict the scope of this invention in any way. The backbone of the weak anion exchange resin is preferably a macroporous matrix, in particular amorphous silica. Macroporous matrix enables higher silver loading in the resin and more efficient elution of silver than similar resins with e.g. gel type matrix. A suitable example of weak anion exchange resins of the present invention are polyamine composites, in particularly silica-polyamine composites. Also suitable are weak base anion exchange resins having macroporous acrylic matrix such as Purolite A830 or Purolite A170 obtainable from Purolite Ltd. Particularly preferred resin is a polyamine ion exchange resin having commercial name PSI WPGM obtainable from Purity Systems Inc.

The weak anion exchange resins of the present invention are particularly suitable for silver containing halide solutions having pH below 3, preferably from 0 to 2, more preferably from 0 to 1.

When required the method of the present invention further comprises a step of (g) treating the ion exchange resin with acidic solution, preferably a hydrochloric acid solution, to protonate the resin and to obtain a protonated resin. This allows reuse of the ion exchange column in a next silver recovery sequence in cases where the resin is in an unprotonated state after elution of silver from the resin. The requirement for the protonation of the resin depends of the nature of the eluent utilized for the elution of silver from the resin. If an acidic thiourea solution is utilized as the eluent, the regeneration step can be avoided. However, if an aqueous solution comprising one or more thiosulfate salt, in particular sodium thiosulfate $Na_2S_2O_3$, and optionally $Na_2SO_3$ is utilized as an eluent, a protonation step (f) is required before the ion exchange column can be reused.

The weak anion exchange resin will absorb also metals other than silver that are present silver containing halide solution. The affinity for metals will depend on the nature of the resin. For example the affinity of PSI WPGM increases in the following order: Pb>Ag>Zn>Cu>Fe>Ni>Mg resulting in that while silver is absorbed in the resin evidently also all lead and some zinc is also absorbed. Furthermore, as copper is typically present in leach solution such as the silver containing halide solution of the present invention in high concentration, also a small part of the copper will be absorbed to the resin.

Accordingly, the method of the present invention involves a washing sequence that removes at least most of any metals that absorbed in the resin and which are not desired in the final purified silver solution before silver is eluted from the resin. The washing sequence of the present invention typically comprises three steps.

In accordance with the present invention the loaded resin is first washed with a first washing solution to remove absorbed zinc and most of the copper.

In a suitable example of the present invention the first washing solution is water or an aqueous solution comprising NaCl and/or $CaCl_2$. The concentration of NaCl and/or $CaCl_2$ is typically from 0.01 to 3 M. The first washing solution is preferably water, as it provides high selectivity for rinsing off absorbed zinc. Also an aqueous solution comprising hydrochloric acid can be used as the first washing solution, whereby also most of copper is rinsed off in this step.

After the first wash the washed resin is washed with a second washing solution to remove rest of copper from the loaded resin.

In a preferable example of the present invention the second washing solution is an aqueous solution comprising hydrochloric acid. The concentration of the hydrochloric acid is typically from 0.5 to 4.0 M, preferably from 1.0 to 2.0 M.

Optionally after the second wash the washed resin is washed with a third washing solution to remove lead from the loaded resin.

In an example of the present invention the third washing solution is an aqueous solution comprising an aminopolycarboxylic acid or salt thereof. The aminopolycarboxylic acid is preferably ethylenediaminetetraacetic acid (EDTA). Sodium salts of EDTA are particularly preferred. The concentration of the aminopolycarboxylic acid or salt thereof is typically from 0.1 to 1.0 M, preferably from 0.25 to 0.50 M.

The washing sequence may comprise any further washing steps required for removing absorbed metals which are not desired in the purified silver containing solution and which would be rinsed off from the resin by the eluent utilized for eluting silver.

After absorbed metals which are not desired in the purified silver containing solution have been removed from the resin by sequential washing steps silver can be eluted from the resin with an eluent.

In accordance with a typical example of the present invention the eluent is an acidic solution comprising thiourea $(SC(NH_2)_2)$, in particular a 1 M HCl solution comprising $SC(NH_2)_2$. The eluent preferably comprises from 1 to 5 wt % $SC(NH_2)_2$, preferably from 1 to 2 wt % $SC(NH_2)_2$ of the total weight of the eluent. In accordance with another example of the present invention the eluent is an aqueous solution comprising one or more thiosulfate salt(s), in particular sodium thiosulfate $(Na_2S_2O_3)$, and optionally sodium sulfite $(Na_2SO_3)$ for stabilizing the solution. In this case the eluent preferably comprises 1 to 2 M $Na_2S_2O_3$.

As described above the present invention provides the use of a weak anion exchange resin for recovering silver from pregnant leach solution resulting from hydrometallurgical treatment of silver containing ores and/or concentrates.

FIG. 1 illustrates an example of the silver recovery process of the present invention in which silver is recovered from a pregnant leach solution (PLS) comprising silver, copper, zinc and lead. The PLS 1 is introduced into an ion exchange column 10, . . . , 50 comprising weak anion exchange resin, preferably PSI WPGM. Silver, copper, zinc and lead are absorbed in the resin and a metal depleted raffinate 12 is obtained. The loaded weak anion exchange resin is then washed with a first washing solution 21, preferably water or an aqueous solution comprising NaCl and/or $CaCl_2$ as discussed above, to rinse off absorbed zinc and at least part of the copper to obtain a copper and zinc containing solution as the bleed-off 22. Thereafter the washed resin is further washed with a second washing solution 31, preferably an aqueous solution comprising HCl as discussed above, to rinse off remaining copper and to obtain a copper containing solution as the bleed-off 32. Optionally after the second wash the washed resin is washed with a third washing solution 41, preferably an aqueous solution comprising a salt of EDTA, as discussed above, to remove lead from the loaded resin an to obtain a lead containing solution as the bleed-off 42.

Silver is then eluted from the resin with a suitable eluent 51, as discussed above, to obtain a silver containing solution 6. If required the resin is then treated with an acidic solution to protonate the resin (not shown). The protonated ion exchange column 11 can then be reused in next silver recovery sequence.

The ion exchange procedure is usually performed continuously in columns where resins are stationary and the different solutions are passed though the columns.

EXAMPLES

Example 1

Four weak anion exchange columns shown in Table 1 were tested for recovery of silver from silver containing halide solutions.

TABLE 1

| Column | Matrix | Backbone | Functionality |
|---|---|---|---|
| PSI WPGM | macroporous | silica | polyamine |
| Purolite A830 | macroporous | polyacrylic | amine complex |
| Purolite A170 | macroporous | polystyrene | amine complex |
| Purolite A172 | gel | polystyrene | amine complex |

Each experiment was performed at room temperature using the same elution sequence and same elution solutions. The column bed volume (BV) was 20 mL and flow rate 2 mL/min, i.e. 6 BV/h. Each column was pretreated by eluting with 1 M NaOH (0.2 M for the PSI WPGM), 1 M HCl, and water. Composition of the silver containing halide solution was the following: 23 mh/L Ag, 55 g/L Ca, 17 g/l Cu(II), 150 mg/L Fe(III), 1000 mg/L Mg, 25 mg/L Ni, 470 mg/L Pb, 440 ml/L Zn, 20g/L Br, 10 g/L HCl and 220 gl/L $Cl^-$ (added as NaCl).

The silver containing halide solution was charged into the ion exchange column, which was then washed with once with water, two times with a HCl solution, then eluted with a 1M HCl solution containing 2% to remove silver, and finally washed with water. Composition of the eluate was determined after each stage. Results are shown in Tables 2 to 5. FIGS. 2 to 5 show the compositions of the eluate in the silver removal stage and thus the selectivity of the respective columns.

TABLE 2

PSI WPGM

| | | Eluate composition, mg | | | | | | | |
|---|---|---|---|---|---|---|---|---|---|
| Stage | BV | Ag | Ca | Cu | Fe | Mg | Ni | Pb | Zn |
| Charging | 9.5 | 3.9 | 232.3 | 402.0 | 1.1 | 4.9 | 0.0 | 88.7 | 37.0 |
| Water 1 | 1 | 0.0 | 270.1 | 335.0 | 1.5 | 3.7 | 0.1 | 0.4 | 39.6 |
| 1M HCl F1 | 2 | 0.0 | 1.0 | 3.9 | 0.0 | 0.0 | 0.0 | 0.5 | 1.8 |
| 1M HCl F2 | 2 | 0.0 | 0.7 | 0.5 | 0.0 | 0.0 | 0.0 | 0.2 | 0.1 |
| 1M HCl + 2% TU | 5 | 3.6 | 1.1 | 0.5 | 0.0 | 0.0 | 0.0 | 2.3 | 0.1 |
| Water 2 | 2 | 0.0 | 0.2 | 0.0 | 0.0 | 0.0 | 0.0 | 16.9 | 0.0 |
| In analyte | 9.5 | 4.5 | 10716.9 | 3292.3 | 27.4 | 184.8 | 4.9 | 91.9 | 83.6 |
| Recovery % | 9.5 | 87.7 | 2.2 | 12.2 | 4.1 | 2.7 | 0.1 | 96.5 | 44.2 |

TABLE 3

Purolite A830

| | | Eluate composition, mg | | | | | | | |
|---|---|---|---|---|---|---|---|---|---|
| Stage | BV | Ag | Ca | Cu | Fe | Mg | Ni | Pb | Zn |
| Charging | 9.5 | 2.9 | 360.0 | 520.4 | 5.4 | 4.1 | 0.1 | 53.8 | 52.5 |
| Water 1 | 1 | 0.0 | 346.4 | 300.4 | 2.9 | 5.2 | 0.1 | 1.2 | 7.1 |
| 1M HCl F1 | 2 | 0.0 | 123.3 | 167.5 | 1.7 | 1.7 | 0.1 | 1.0 | 6.3 |
| 1M HCl F2 | 2 | 0.0 | 19.2 | 63.6 | 0.5 | 0.2 | 0.0 | 1.0 | 7.8 |
| 1M HCl + 2% TU | 5 | 2.6 | 0.6 | 6.7 | 0.0 | 0.0 | 0.0 | 5.8 | 14.9 |
| Water 2 | 2 | 0.0 | 0.1 | 0.2 | 0.0 | 0.0 | 0.0 | 14.1 | 11.7 |
| In analyte | 9.5 | 4.5 | 8992.5 | 3190.2 | 29.5 | 174.6 | 5.1 | 91.2 | 87.0 |
| Recovery % | 9.5 | 65.1 | 4.0 | 16.3 | 18.4 | 2.4 | 2.9 | 59.0 | 60.3 |

TABLE 4

Purolite A170

| Stage | BV | Eluate composition, mg | | | | | | | |
|---|---|---|---|---|---|---|---|---|---|
| | | Ag | Ca | Cu | Fe | Mg | Ni | Pb | Zn |
| Charging | 9.5 | 2.5 | 418.2 | 261.2 | 23.1 | 6.5 | 0.0 | 6.4 | 55.2 |
| Water 1 | 1 | 0.0 | 265.3 | 192.7 | 6.6 | 4.4 | 0.1 | 0.9 | 1.7 |
| 1M HCl F1 | 2 | 0.0 | 120.7 | 129.5 | 7.2 | 2.0 | 0.1 | 1.0 | 1.8 |
| 1M HCl F2 | 2 | 0.0 | 17.4 | 30.2 | 5.5 | 0.3 | 0.0 | 0.9 | 1.9 |
| 1M HCl + 2% TU | 5 | 0.8 | 0.6 | 0.8 | 2.7 | 0.0 | 0.0 | 2.7 | 1.9 |
| Water 2 | 2 | 0.4 | 0.1 | 0.5 | 1.0 | 0.0 | 0.0 | 3.1 | 38.9 |
| In analyte | 9.5 | 4.3 | 10261.2 | 3079.6 | 28.6 | 183.1 | 4.8 | 87.9 | 85.3 |
| Recovery % | 9.5 | 59.7 | 4.1 | 8.5 | 80.9 | 3.6 | 0.0 | 7.3 | 64.8 |

TABLE 5

Purolite A172

| Stage | BV | Eluate composition, mg | | | | | | | |
|---|---|---|---|---|---|---|---|---|---|
| | | Ag | Ca | Cu | Fe | Mg | Ni | Pb | Zn |
| Charging | 9.5 | 0.8 | 1703.6 | 67.6 | 3.0 | 32.0 | −0.1 | 0.1 | 10.7 |
| Water 1 | 1 | 0.0 | 145.1 | 68.0 | 1.0 | 2.3 | 0.1 | 0.8 | 2.3 |
| 1M HCl F1 | 2 | 0.0 | 21.9 | 36.1 | 0.5 | 0.3 | 0.1 | 0.4 | 0.9 |
| 1M HCl F2 | 2 | 0.0 | 0.2 | 7.6 | 0.1 | 0.0 | 0.0 | 0.0 | 0.5 |
| 1M HCl + 2% TU | 5 | 0.0 | 0.3 | 0.9 | 0.1 | 0.0 | 0.0 | 0.0 | 0.3 |
| Water 2 | 2 | 0.0 | 0.1 | 0.5 | 0.0 | 0.0 | 0.0 | 0.0 | 0.9 |
| In analyte | 9.5 | 4.1 | 10644.0 | 3025.8 | 29.1 | 207.8 | 4.8 | 87.1 | 85.0 |
| Recovery % | 9.5 | 20.0 | 16.0 | 2.2 | 10.2 | 15.4 | 0.0 | 0.2 | 12.6 |

It will be obvious to a person skilled in the art that, as the technology advances, the inventive concept can be implemented in various ways. The invention and its embodiments are not limited to the examples described above but may vary within the scope of the claims.

The invention claimed is:

1. A method of recovering silver from silver containing halide solutions, comprising:
   (a) providing an ion exchange column comprising a weak anion exchange resin;
   (b) introducing the silver containing halide solution to the ion exchange column to absorb silver in the weak anion exchange resin;
   (c) washing the loaded ion exchange resin with a first washing solution to rinse off absorbed zinc and optionally at least part of copper;
   (d) washing the loaded ion exchange resin with a second washing solution to rinse off remaining copper; and
   (e) optionally washing the loaded ion exchange resin with a third washing solution to rinse off absorbed lead; and
   (f) eluting the loaded ion exchange resin with an eluent to remove silver from the resin and to obtain a silver containing solution.

2. The method as claimed in claim 1, further comprising:
   (g) treating the ion exchange resin with an acidic solution to protonate the resin and to obtain a protonated resin.

3. The method as claimed in claim 2, wherein the acidic solution in step (g) is a hydrochloric acid solution.

4. The method as claimed in claim 1, wherein the silver containing halide solution comprises 0.1 to 1500 mg/L silver.

5. The method as claimed in claim 1, wherein the silver containing halide solution comprises 100 to 300 g/L.

6. The method as claimed in claim 1, wherein the halide is chloride.

7. The method as claimed in claim 1, wherein the silver containing halide solution further comprises 0 to 80 g/L bromides.

8. The method as claimed in claim 1, wherein the silver containing halide solution is obtained by leaching silver containing ore and/or concentrate with an acidic aqueous leaching liquor comprising 10 to 110 g/L $Cu^{2+}$, 50 to 300 g/L $Cl^-$, and 1 to 80 g/L $Br^-$.

9. The method as claimed in claim 1, wherein the pH of the silver containing halide solution is below 3.

10. The method as claimed in claim 1, wherein a backbone of the weak anion exchange resin is a macroporous matrix.

11. The method as claimed in claim 10, wherein the backbone of the weak anion exchange resin is amorphous silica.

12. The method as claimed in claim 1, wherein the weak anion exchange resin comprises amine groups as anion-exchange functional groups.

13. The method as claimed in claim 1, wherein the first washing solution is water or an aqueous solution comprising NaCl and/or $CaCl_2$.

14. The method as claimed in claim 1, wherein the second washing solution is an aqueous solution comprising a hydrochloric acid.

15. The method as claimed in claim 1, wherein the third washing solution is an aqueous solution comprising an aminopolycarboxylic acid or salt thereof.

16. The method as claimed in claim 15, wherein the aminopolycarboxylic acid is ethylenediaminetetraacetic acid (EDTA).

17. The method as claimed in claim 1, wherein the eluent is an acidic solution comprising thiourea ($SC(NH_2)_2$).

18. The method as claimed in claim 17, wherein the concentration of thiourea is from 1 to 5 wt %.

19. The method as claimed in claim 1, wherein the eluent is an aqueous solution containing one or more thiosulfate salt and optionally $Na_2SO_3$.

* * * * *